April 25, 1933.  J. FRIEDL  1,905,560
DRILLING MACHINE
Original Filed March 20, 1924  2 Sheets-Sheet 1
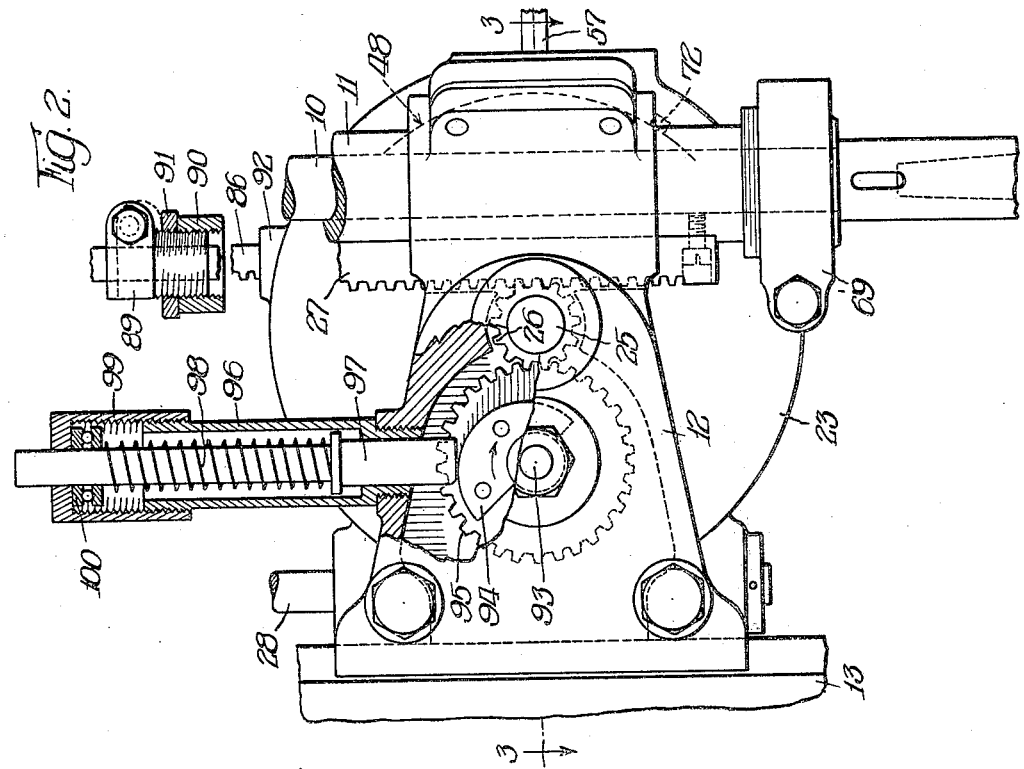
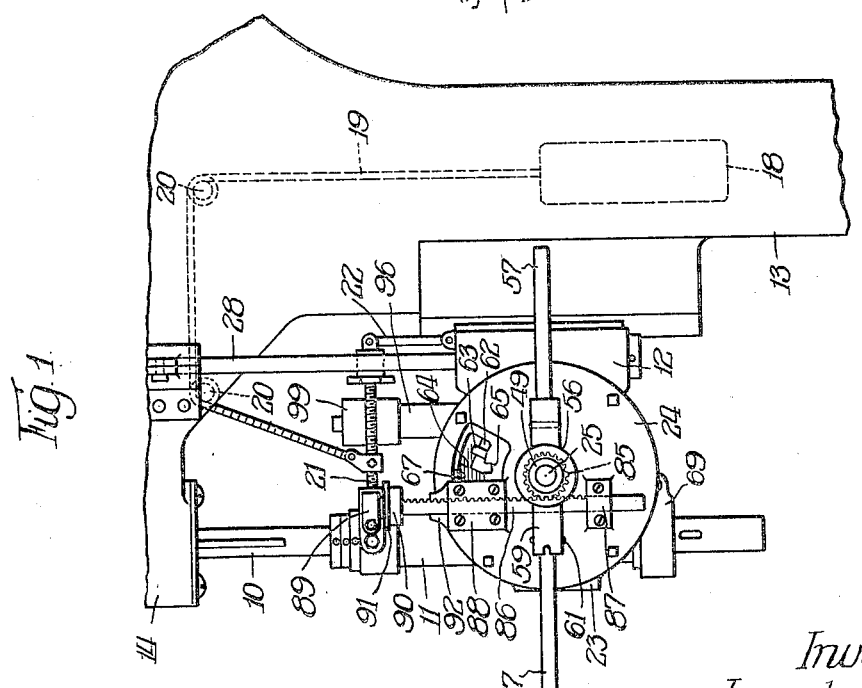
Inventor:
Joseph Friedl,
By Fisher, Clapp, Soans & Pond
Attys.

April 25, 1933. J. FRIEDL 1,905,560
DRILLING MACHINE
Original Filed March 20, 1924 2 Sheets-Sheet 2
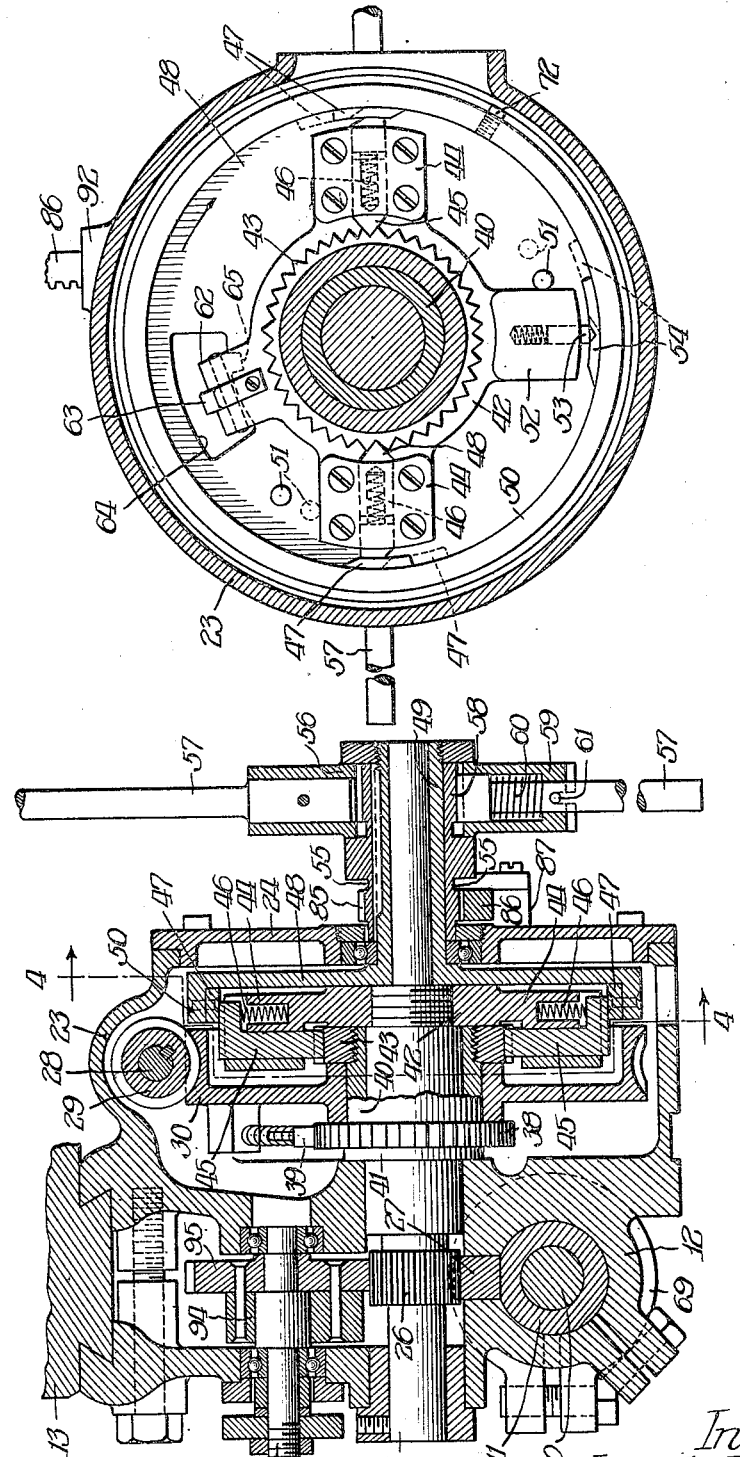
Inventor:
Joseph Friedl,
By Fisher, Clapp, Soans & Pond attys.

Patented Apr. 25, 1933

1,905,560

UNITED STATES PATENT OFFICE

JOSEPH FRIEDL, OF COVINGTON, KENTUCKY, ASSIGNOR TO THE AVEY DRILLING MACHINE COMPANY, OF CINCINNATI, OHIO, A CORPORATION OF OHIO

DRILLING MACHINE

Original application filed March 20, 1924, Serial No. 700,525. Divided and this application filed June 23, 1930. Serial No. 462,974.

The present application is a division of a prior application filed by me in the United States Patent Office March 20, 1924, Serial No. 700,525 Patent No. 1,767,752, June 24, 1930.

The improvement relates to drilling machines and more particularly to such machines as are provided with power-actuated mechanism for feeding the drill spindle during its working stroke and which mechanism is automatically disengaged at the end of the working stroke to permit the return or upward movement of the drill spindle by means of a counterweight or the like.

The present invention seeks to provide improved, simple means for cushioning or regulating the return movement of the drill spindle and which can be readily regulated to control such return movement as desired. The invention consists in the features of improvement hereinafter set forth, illustrated in the preferred form in the accompanying drawings and more particularly pointed out in the appended claims.

In the drawings:

Fig. 1 is a partial elevation showing one side of the drilling machine to which the present improvement is applied.

Fig. 2 is an elevation of the opposite side of the guiding head for the drill spindle with parts broken away and parts shown in section to illustrate the construction of the improved cushioning means.

Fig. 3 is a horizontal section on the line 3—3 of Fig. 2.

Fig. 4 is a vertical section on the line 4—4 of Fig. 3.

The drill spindle 10 is journaled, as usual, in a supporting sleeve 11 that is vertically movable through a guiding head 12, the latter being adjustably clamped in position on the front face of a hollow standard 13. A counterweight 18 within the hollow standard 13 is connected to one end of a chain 19 that extends upwardly and outwardly over guide rollers 20 and is connected either directly to the guiding sleeve 11 or, as in the form shown, to an arm or lever 21 pivoted at its outer end to the sleeve and at its inner end to a link 22, the lower end of which is pivoted on the guiding head 12.

The guiding head 12 (see Fig. 3) is chambered to provide a gear casing 23 closed by a cover plate 24. The usual feed shaft 25 is journaled in the head and cover plate. A pinion 26 on the feed shaft engages a rack 27 on the spindle sleeve 11 and means is provided for effecting the rotation of this feed shaft either by power or by hand.

For effecting the power feed of the drill spindle, a vertical shaft 28 is journaled in the rear portion of the gear casing 23 and carries a worm 29 which meshes with a worm wheel 30 loosely mounted on the feed shaft and adapted to be connected thereto by suitable clutch mechanism. The worm shaft 28 extends upwardly from the guiding head as usual and, as set forth in the prior application referred to, it is driven preferably by a variable speed mechanism from the drill spindle, the latter in turn being driven as usual by a pulley through which it extends and which is connected to a suitable drive or motor shaft.

In the form shown, the worm wheel 30 which rotates continuously when the drilling machine is in operation, is connected to the feed shaft 25 both by an over-running connection and also by cooperating clutch members. The over-running connection comprises a ratchet wheel 38 and one or more spring-pressed pawls 39 mounted on the worm wheel. The ratchet wheel is formed on one end of a sleeve 40 which is loosely mounted upon the enlarged central portion of the shaft 25 between a flange 41 thereon and a clutch disk 42 which is threaded on to a section of the feed shaft. The hub of the worm wheel is loosely mounted on the sleeve 40 between the ratchet 38 and a clutch member 43 that is threaded on the end of the sleeve. The clutch disk 42 is provided with arms 44 (see Fig. 4) upon which are guided a pair of radially movable dogs 45. The latter have beveled inner ends and are adapted to be shifted into and out of engagement with the beveled saw teeth of the clutch member 43 to thereby connect and disconnect the clutch members. Springs 46 arranged in sockets in the arms 44 tend to shift the clutch dogs 45 outwardly to their disengaged positions. The dogs are shifted against the tension of these springs into their engaged positions by a pair of cam lugs 47 formed upon a rotatable clutch shifter. The latter is in the form of a disk 48 having a hub 49 loosely mounted on the reduced outer end of the feed shaft 25 and extending outwardly through a bearing in the gear case cover 24. This disk has an inwardly projecting flange 50 on which the cams or shoes 47 are mounted. Two pins 51 (see Fig. 4) fixed to the shifter disk 48 are arranged to alternately engage one of the arms 44 and another arm 52 formed upon the clutch member 42, so that a limited lost motion connection is provided between the clutch shifter and the driven clutch member 42 that is fixed to the feed shaft 26. This limited movement of the clutch shifter permits the movement of the cam lugs into and out of engagement with the clutch dogs 45 as indicated in full and dotted lines in Fig. 4, to thereby throw the power feed mechanism into and out of operation. A spring-pressed pin 53 on the arm 52 is arranged to engage a recess in a third cam lug or shoe 54 on the flange of the clutch shifter to hold the latter against accidental relative movement.

A sleeve 55 keyed on the projecting sleeve 49 of the clutch shifter is connected to a hand feed lever comprising a hub 56 and arms 57. Preferably the hub 56 is loosely mounted on a toothed or notched portion 58 of the sleeve between a flange thereon and a collar threaded on the end of the sleeve, and one of the arms is radially movable so that its inner end may be shifted into and out of locking engagement with the toothed portion 58. The movable arm extends through a socket 59 on the hub 56 and a spring 60 in this socket tends to force the arm inwardly. A cross pin 61 on the arm can, by rotating the latter, be brought into line with deep and shallow notches in the end of the socket to hold the arm 57 in engagement with the toothed portion 58 or out of engagement therewith.

When connected to the clutch shifter, the hand lever can be employed to engage or disengage the clutch members to throw the power feed into and out of operation and also, because of the over-running connection, to effect the quick approach of the drill spindle to the work when the clutch members are engaged. If desired, as set forth in the prior application referred to, the clutch shifter may be locked against relative movement by means of a dog or latch 63 pivoted on a projection 62 of the clutch member 42, and projecting outwardly through an opening 64 in the clutch shifter disk 48. This opening is provided with a notch or seat 65 with which the latch 63 may be engaged to lock the clutch shifter and hand lever against relative movement. Then these parts are no longer effective to engage the power feed but are operative to manually effect the working and return strokes of the drill spindle.

To automatically open the clutch and disengage the power feed, sleeve 55 that is keyed to the clutch shifter, is provided with a pinion 85 (see Figs. 1 and 3) which meshes with a vertically movable rack bar 86 that slides in guides 87 and 88 on the cover plate 24. A sleeve 89 adjustably clamped on the upper portion of the rack bar has a stop collar 90 adjustably threaded thereon and held in adjusted position by a lock nut 91. At the end of the working stroke, stop collar 90 engages a lug 92 on the upper end of the guide 88 and arrests the movement of the rack bar and clutch controlling shifter 48 so that the continued forward movement of the clutch members disengage the dogs 45 from the cam lugs 47 and the clutch dogs will be shifted outwardly by the springs 46 to disengage the power feed. Then, of course, unless the hand lever is engaged with the clutch shifter and held against movement, the counterweight 18 will automatically effect the return movement of the spindle sleeve and the drill spindle. If desired, means may be provided, such for example as set forth in the prior application referred to, for engaging a lug 72 (see Fig. 2) and effecting the relative movement of the clutch shifter 48 to automatically engage the clutch members at the end of the return stroke of the spindle.

A short shaft 93 (see Figs. 2 and 3) is journaled in the guiding head in rear of the feed shaft 25 and this shaft carries an eccentric cam 94 and a gear 95, the latter meshing with the feed shaft pinion 26. A vertical sleeve 96 is fixed to the guiding head and a plunger 97 guided in the sleeve is pressed into engagement with the cam by a spring 98. This spring is coiled about the stem of the plunger and the pressure exerted by the spring can be adjusted by a cap 99 threaded upon the sleeve and engaging the upper end of the spring. Preferably, to permit the easy rotation of the adjusting cap 99, a ball-bearing 100 is interposed between the end of the cap and the spring 98.

The gear 95 and cam 94 rotate as the drill spindle is reciprocated and the parts are so arranged that the spring 98 moves the plunger 97 downwardly during the working stroke of the drill spindle. During the return stroke, the cam 94 forces the plunger upwardly and compresses the spring so that the latter applies a constantly increasing resistance to the return movement of the spindle. By thus cushioning the return stroke of the spindle, the counterweight 18 may be arranged to effect such movement quickly and without shock. By adjusting the tension of the spring by means of the cap 99, it is possible to compensate for varying loads on the spindle and to control, as desired, the operation of the counterweight in effecting the return or upward movement of the spindle sleeve and spindle.

The gearing between the drill spindle and the cam is such that the cam rotates through about a half revolution during the full stroke of the spindle. But since the throw of the cam is but a fraction of that of the spindle, a relatively heavy spring can be employed which is gradually compressed by the cam to apply an increasing resistance to the movement of the spindle substantially throughout its entire return stroke. With the improved arrangement, the counterweight may be adjusted or arranged to effect the quick return movement of the spindle, but, since the cam and spring apply a gradually increasing resistance to such movement, the return stroke is effected smoothly and the spindle is arrested without shock or vibration. That is to say, the return stroke of the spindle sleeve and spindle is arrested without rebound as is apt to be the case where a cushioning spring is brought into operation only at the end of the return stroke. Also, since the cam-actuated spring-held plunger is effective throughout substantially the entire return stroke, the spring of the plunger can be readily adjusted, in the form shown, by the cap 99, to properly control the return movement under widely varying conditions with respect to the weights of different tools applied to the drill spindle.

Changes may be made in the detail set forth without departure from the scope of the invention as defined in the appended claims.

I claim as my invention:

1. In a drill machine, the combination of a drill spindle, a power feed and a counterbalance for effecting the working and return strokes respectively of the spindle, and oscillating cam geared to said spindle, and an adjustably spring-pressed plunger constantly engaging and cooperating with said cam to control the return movement of the spindle.

2. In a drilling or like machine, a vertical reciprocating tool member, a power feed and counterbalancing means for effecting the working and return strokes respectively of the tool member, a cam connected to said member to move back and forth therewith and a cooperating spring, the force of which is gradually increased by said cam substantially throughout the entire return stroke of the tool member, for opposing said counterbalancing means.

3. In a drilling or like machine, a vertical reciprocating tool member, a power feed and counterbalancing means for effecting the working and return strokes respectively of the tool member, a cam connected to said member to move back and forth therewith and a cooperating spring, the force of which is gradually increased by said cam during the return stroke of the tool member, for opposing said counterbalancing means and cushioning the return movement of the tool member, and means for adjusting said spring to compensate for varying loads on the tool member.

4. In a drilling machine, a drill spindle and spindle sleeve, a counterweight connected to the spindle sleeve, an oscillating cam geared to the drill spindle, and a spring cooperating with said cam to cushion the return movement of the drill spindle, and means for adjusting said spring to compensate for varying loads on the spindle.

5. In a drilling machine, a drill spindle, a power feed therefor, means for disengaging the power feed at the end of the working stroke of the spindle, a counterweight for effecting the return stroke of the spindle, a cam connected to the spindle to move back and forth therewith and an adjustable cushioning spring, the force of which is gradually increased by said cam substantially throughout the entire return stroke of the spindle.

6. In a drilling machine, a drill spindle, a power feed therefor, means for disengaging the power feed at the end of the working stroke of the spindle, a counterweight for effecting the return stroke of the spindle, an oscillating cam geared to the spindle, a cooperating plunger, a spring engaging the plunger and gradually compressed thereby during the return stroke of the spindle, and means for adjustably compressing said spring.

7. In combination in a drilling machine, a drill spindle and spindle sleeve, a guiding head therefor, a power feed and a counterbalance for effecting the working and return strokes respectively of the drill spindle and sleeve, an oscillating cam journalled in said guiding head and geared to the spindle sleeve to move back and forth therewith, a sleeve fixed to said head, a plunger guided in said sleeve, a cushioning spring coiled about said plunger and maintaining the same in engagement with said cam, the latter being arranged to gradually compress said spring substantially throughout the entire return stroke of the spindle and spindle sleeve and a member mounted on said sleeve for adjustably compressing said spring.

JOSEPH FRIEDL.